(12) United States Patent
Revankar et al.

(10) Patent No.: US 11,644,074 B2
(45) Date of Patent: May 9, 2023

(54) AUTOMATIC SLACK ADJUSTER FOR VEHICLE, BRAKING SYSTEM AND WHEELSET HAVING AN AUTOMATIC SLACK ADJUSTER

(71) Applicant: WABCO INDIA LIMITED, Chennai TN (IN)

(72) Inventors: Akash Ashok Revankar, Karnataka (IN); Dhanavel Mariappan, Chennai (IN); Rajasekar Paranjothi, Tamil Nadu (IN)

(73) Assignee: ZF Commercial Vehicle Control Systems India Limited, Tamil Nadu (IN)

( * ) Notice: Subject to any disclaimer, the term of this patent is extended or adjusted under 35 U.S.C. 154(b) by 47 days.

(21) Appl. No.: 17/314,605

(22) Filed: May 7, 2021

(65) Prior Publication Data

US 2021/0348665 A1 Nov. 11, 2021

(30) Foreign Application Priority Data

May 9, 2020 (IN) .............................. 202041019688

(51) Int. Cl.
*F16D 65/70* (2006.01)
*F16D 65/22* (2006.01)
(Continued)

(52) U.S. Cl.
CPC ............. *F16D 65/70* (2013.01); *F16D 65/22* (2013.01); *F16D 2066/003* (2013.01); *F16D 2125/64* (2013.01); *F16D 2125/70* (2013.01)

(58) Field of Classification Search
CPC ........... F16D 2066/003; F16D 2125/70; F16D 65/70; F16D 65/22; B60T 7/108; B61H 15/00
See application file for complete search history.

(56) References Cited

U.S. PATENT DOCUMENTS 5,253,735 A * 10/1993 Larson ................... F16D 66/025
324/207.2
5,320,198 A * 6/1994 Hoyt ....................... F16D 66/02
188/1.11 W (Continued)

FOREIGN PATENT DOCUMENTS

| CN | 105102844 A | 11/2015 |
| CN | 107366698 A | 11/2017 |
| CN | 208900591 U | 5/2019 |

*Primary Examiner* — Vishal R Sahni
(74) *Attorney, Agent, or Firm* — Dickinson Wright PLLC

(57) ABSTRACT

An automatic slack adjuster includes a lever configured to be coupled to a push rod of a brake actuator, and to pivot about a rotational axis when actuated by the push rod, the rotational axis having a predetermined fixed location relative to the vehicle. A stroke indicator label is arranged on the lever and configured to designate, for the automatic slack adjuster, a predetermined zero stroke position, a working stroke range, and an overstroke range. A stroke indicator element is configured to visualize the current stroke level of the automatic slack adjuster on the indicator label by way of relative movement between the stroke indicator element and the stroke indicator label in response to pivotal movement of the lever. A mounting bracket of a mounting interface can be adjusted relative to the rotational axis for correctly installing the stroke indicator element.

18 Claims, 2 Drawing Sheets

(51) Int. Cl.
  *F16D 66/00* (2006.01)
  *F16D 125/64* (2012.01)
  *F16D 125/70* (2012.01)

(56) References Cited

U.S. PATENT DOCUMENTS

| | | |
|---|---|---|
| 5,535,854 A | 7/1996 | Prince |
| 5,762,165 A * | 6/1998 | Crewson ................ F16D 65/60 188/1.11 W |
| 6,105,730 A * | 8/2000 | Ekeroth ................ F16D 66/025 324/207.2 |
| 6,215,394 B1 | 4/2001 | Sellin |
| 6,390,244 B1 | 5/2002 | Sitter |
| 7,299,899 B2 * | 11/2007 | Severinsson ............ F16D 66/02 188/1.11 L |
| 9,447,832 B2 * | 9/2016 | Todd .................... B60T 17/088 |
| 2007/0205060 A1 * | 9/2007 | Salazar .................. F16D 66/00 188/1.11 W |
| 2010/0018812 A1 | 1/2010 | Louis |
| 2011/0241866 A1 * | 10/2011 | Todd .................... B60T 17/088 701/31.4 |
| 2012/0031716 A1 | 2/2012 | Flodin et al. |
| 2013/0255366 A1 * | 10/2013 | Seglo ........................ G01L 5/28 74/519 |
| 2018/0038433 A1 * | 2/2018 | Drake .................... F16D 65/28 |

\* cited by examiner

AUTOMATIC SLACK ADJUSTER FOR VEHICLE, BRAKING SYSTEM AND WHEELSET HAVING AN AUTOMATIC SLACK ADJUSTER

FIELD

The present disclosure relates to an automatic slack adjuster for braking systems of automotive vehicles, in particular for drum brakes of commercial vehicles.

BACKGROUND

Automatic slack adjusters for braking systems of automotive vehicles are generally known in the industry. These slack adjusters are used to maintain generally constant gap widths between a brake lining or brake pad of the brake mechanism and the counterpart to be braked such as a brake drum mounted to a wheel. Typical brake mechanisms used in combination with automatic slack adjusters are so-called "S-Cam" brakes. Automatic slack adjusters are typically designed and required to operate with specific working gap widths. These specific working gap widths are set during manufacture of the automatic slack adjuster such that each individual slack adjuster type will have a specific range of working gap width between brake lining or brake pad and the counterpart to be braked, such as a brake drum.

During the installation procedure of a brake mechanism to the vehicle, the automatic slack adjuster needs to be fitted to the vehicle. In most cases, the automatic slack adjuster is fitted and mounted to an axle or swingarm of the vehicle. During fitting of the automatic slack adjuster, the operator has to ensure that the stroke transmitted to the slack adjuster and on to the brake mechanism remains within legally specified or desired limits.

As an alternative to an operator with a tool to inspect whether fitment is being done correctly, there are systems that include a combination of a stroke indicator label and stroke indicator element. In these systems, the stroke indicator element is formed as a triangular pointer that is pivotably arranged on an end portion of the push rod of the brake actuator. The pivoting movement of the pointer relative to the slack adjuster is achieved by coupling one of the corners of the triangular pointer to a linkage element which in turn is pivotably coupled to the slack adjuster body. When the push rod moves and causes the slack adjuster to pivot, the triangular pointer is also caused to pivot. Due to the double pivoting linkage coupled to the pointer, the pointer will also pivot relatively to the slack adjuster and move its free angular corner past the stroke indicator label on the slack adjuster.

This installation routine for correctly mounting the pointer mechanism in between the push rod and the slack adjuster, however, is cumbersome for the operator. Additionally, a relatively large number of parts are needed to produce the aforementioned kinematics for moving the pointer.

SUMMARY

It is therefore an object of the invention to provide an improved automatic slack adjuster which overcomes the above described disadvantages. In particular, it is an object of the invention to provide an automatic slack adjuster that is easy to install without sacrificing the reliability of an indicator function of the slack adjuster working stroke.

The object is achieved via an automatic slack adjuster, the slack adjuster including a lever that is configured to be operatively coupled to a push rod of a brake actuator, and to pivot about a rotational axis when actuated by the push rod, the rotational axis having a predetermined fixed location relative to the vehicle, a stroke indicator label arranged on the lever and configured to designate, for the automatic slack adjuster, a predetermined zero stroke position, a working stroke range, and an overstroke range, and a stroke indicator element that is configured to visualize the current stroke level of the automatic slack adjuster between the predetermined zero stroke position, working stroke range, and overstroke range on the indicator label by way of relative movement between the stroke indicator element and the stroke indicator label.

In particular, the present disclosure provides, according to one aspect, that the automatic slack adjuster features a stroke indicator element that is positioned on the automatic slack adjuster such that the lever pivots relative to the stroke indicator element about the rotational axis, and the stroke indicator element further includes a mounting interface configured to attach the stroke indicator element in a fixed location to the vehicle. The present disclosure is based upon the realization that a reliable indicating function can be achieved without having to move the stroke indicator element itself at all. Rather, the present disclosure provides having the stroke indicator element remain stationary on the vehicle, while only the slack adjuster moves, i.e. pivots about the rotational axis. This arrangement greatly simplifies the part complexity and mounting procedure for the operator without compromising the stroke indication functionality. Due to the reduced number of components, the slack adjuster according to the present disclosure is less prone to mechanical failures, requires less space inside the vehicle, and saves weight.

In one aspect, the stroke indicator label comprises a label plate that is non-releasably fixed to the lever, preferably by riveting. Alternatively, other means for permanently attaching the stroke indicator label to the slack adjuster may be employed. Beneficially, the stroke indicator label is fastened to the slack adjuster such that removal of the label inevitably causes destruction of the label. This renders the indicator label tamper-proof, because it becomes more difficult to replace the original stroke indicator label with a fraudulent stroke indicator label.

In another aspect, the stroke indicator element comprises a pointer needle facing towards the stroke indicator label. In a further aspect, the tip portion of the pointer needle is offset from the remaining portion of the pointer needle in a direction towards the indicator label. Firstly, forming the indicator element as a needle increases the read-out precision for the operator. Secondly, moving the end portion of the needle closer towards the label improves read-out precision from inclined viewpoints.

In yet another aspect, the stroke indicator element includes a control arm facing towards the mounting interface. The control arm may be substantially opposite of the pointer needle, but may also be oriented at a different angle depending on the requirements of the current vehicle setup. Preferably, the control arm is configured to withstand rotational and/or translational forces acting on the pointer needle or other parts of the stroke indicator element.

In another aspect, the stroke indicator element includes a positioning collar that extends along the direction of the rotational axis and is arranged concentrically around the rotational axis. Preferably, in one aspect, the positioning collar engages a correspondingly shaped recess of the slack adjuster. The positioning collar may be formed as one single and continuous annular rim.

Installation of the stroke indicator element thus is simplified even further. In order to correctly position the stroke indicator element with respect to the slack adjuster, it is sufficient to insert the positioning collar into the corresponding recess, and the two elements automatically have a correct pivot point relative to one another based on their respective corresponding shapes.

In the slack adjuster according to an aspect of the present disclosure, the rotational axis preferably is oriented coaxially to a rotating brake shaft, also referred to as cam shaft or cam spline for drum brakes, of the braking system.

In yet another aspect, the positioning collar includes a plurality of positioning teeth that are distributed along the circumference of the collar, preferably equidistantly in one aspect, and further preferably arranged on a common diameter.

In a further aspect, the mounting interface includes a mounting bracket configured to fasten the stroke indicator element to an axle or swingarm of the vehicle. For doing so, the axle/swingarm of the vehicle preferably comprises a corresponding mounting interface. Preferably, the mounting bracket is releasably coupled to the axle/swingarm of the vehicle by way of a screw connection.

In a further aspect, the mounting bracket includes a first elongate hole for adjusting the radial position of the mounting bracket relative to the rotational axis, and the stroke indicator element includes a protruding feature that is dimensioned correspondingly and extends into the first elongate hole. Alternatively, in one aspect, the stroke indicator element includes a first elongate hole for adjusting the radial position of the mounting bracket relative to the rotational axis, and the mounting bracket includes a protruding feature that is dimensioned correspondingly and extends into the first elongate hole. By providing the elongate hole and corresponding protruding feature between the mounting bracket and the stroke indicator element, it is possible to mount a stroke indicator element to a slack adjuster for a variety of different vehicle configurations without needing distinct part numbers.

In a further aspect, the mounting bracket includes a second elongate hole for adjusting the rotational position of the stroke indicator element. The second elongate hole again improves the flexibility of mounting the slack adjuster to a variety of different vehicle configurations.

The present disclosure has herein above been described with reference to an automatic slack adjuster in a first embodiment of the disclosure. In a second embodiment, however, the present disclosure relates to a braking system for an automotive vehicle, in particular a drum brake system for a commercial vehicle, the braking system including a brake actuator, in particular a pneumatic, electropneumatic or electronic brake actuator, having a push rod, a brake mechanism, in particular a drum brake, configured to apply a braking force to a wheel of the vehicle, said brake mechanism, in one aspect, having at least one non-rotating brake pad (also referred to as brake liner) and at least one rotating part to be braked (such as a brake drum), and an air gap between the brake pad and the part to be braked, and an automatic slack adjuster operatively coupled between the brake actuator and the brake mechanism.

The present disclosure achieves the initially mentioned object in this second embodiment by providing a braking system of the aforementioned type, wherein the automatic slack adjuster is configured in accordance with any one of the various aspects described herein above under the first embodiment.

The advantages and preferred aspects of the automatic slack adjuster of the first embodiment are at the same time also advantages and preferred aspects of the braking system of the second embodiment. In order to avoid unnecessary repetition, reference is made to the description herein above.

In a third embodiment, the present disclosure also relates to a wheelset of an automotive vehicle, in particular of a commercial vehicle, including an axle or swingarm, a wheel rotatably mounted to the axle or swingarm, a brake actuator fixedly mounted to the axle or swingarm, a brake mechanism fixedly mounted to the axle or swingarm and operatively coupled to the brake actuator in order to apply a braking force to the wheel, and an automatic slack adjuster operatively coupled between the brake actuator and the brake mechanism.

The present disclosure achieves the initially mentioned object with a wheelset of this embodiment by providing that the automatic slack adjuster is configured in accordance with any one of the preferred aspects described herein above in the first embodiment.

Also with the third embodiment, preferred aspects and advantages of the automatic slack adjuster of the first embodiment are at the same time preferred aspects and advantages of the wheelset according to the present disclosure. In order to avoid unnecessary repetition, reference is made to the description herein above for that reason.

For a more complete understanding of the present disclosure, the present disclosure will further be described in more detail with reference to the accompanying drawings. The detailed description will illustrate and describe what is considered one preferred embodiment or aspect of the present disclosure. It should of course be understood that various modifications and changes in form or detail could readily be made without departing from the scope of the invention of the present disclosure. It is therefore intended that the invention may not be limited to the exact form and detail shown and described herein, nor to anything less than the whole of the invention disclosed herein and disclaimed hereinafter. Further, the features described in the description, the drawings, and the claims disclosing the invention may be considered alone or in combination. In particular, any reference signs in the claims shall not be construed as limiting the scope of the invention. The word "comprising" does not exclude other elements or steps. The wording "a" or "an" does not exclude a plurality.

BRIEF DESCRIPTION OF THE DRAWINGS

The present disclosure will now be described with reference to the accompanying drawings which illustrate one of several possible embodiments or aspects of the automatic slack adjuster provided herein by way of example and not by way of limitation, and wherein.

DETAILED DESCRIPTION OF THE DRAWINGS

Figure 1:
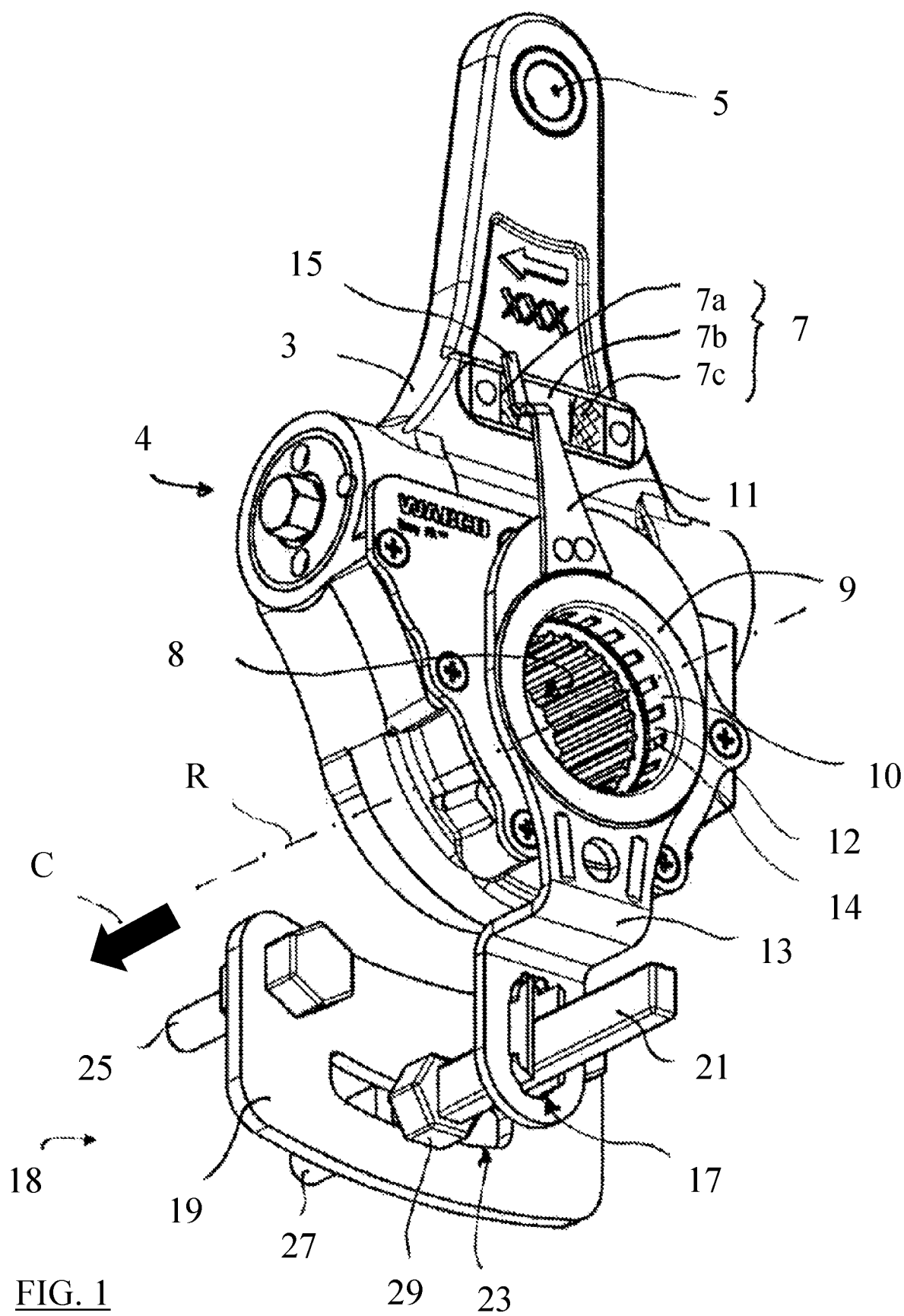
FIG. 1 illustrates a three-dimensional perspective representation of an automatic slack adjuster according to an aspect of the present disclosure.
Figure 2:
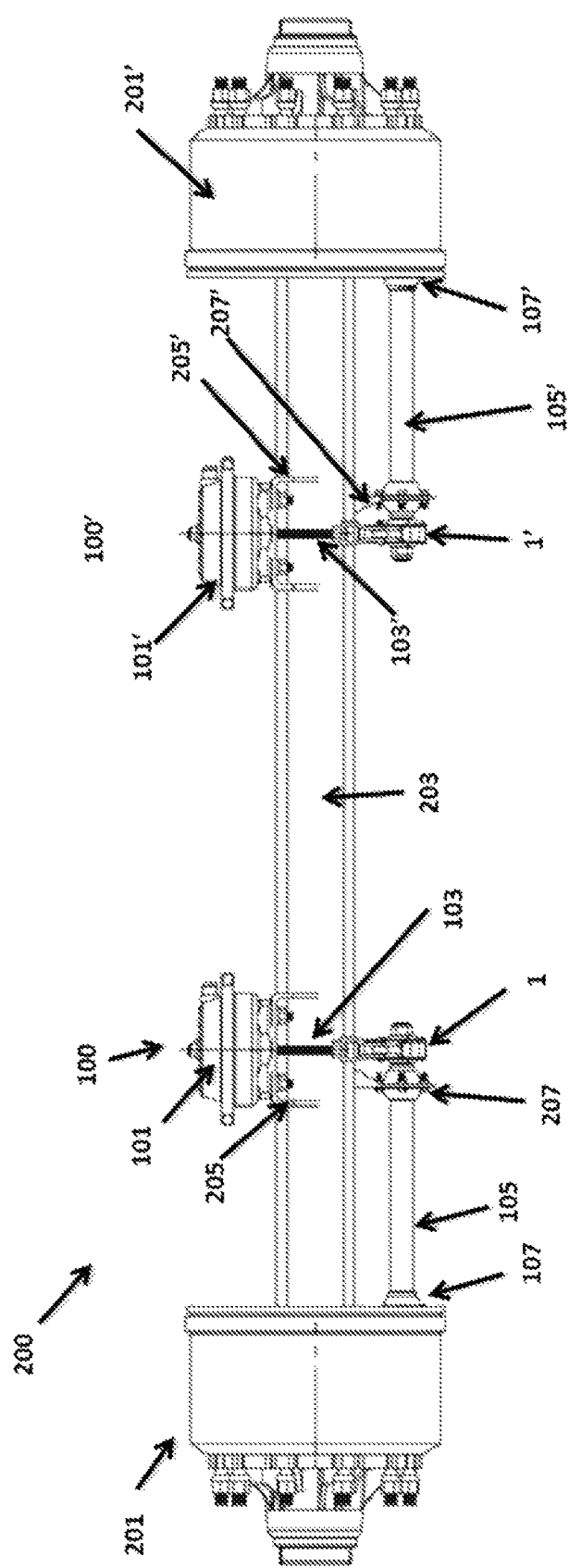
FIG. 2 illustrates the automatic slack adjuster of FIG. 1 installed on the wheelset of a vehicle according to an aspect of the present disclosure.

FIG. 1 depicts one aspect of an automatic slack adjuster 1. The automatic slack adjuster 1 includes a lever 3, which also functions as a housing for the slack adjuster mechanism 4. On its periphery at one end, the automatic slack adjuster 1 includes a mounting interface 5 for operatively coupling the lever 3 to a push rod of a brake actuator 101 (FIG. 2).

On the lever 3, the automatic slack adjuster 1 includes a stroke indicator label 7. The stroke indicator label 7 may be riveted or otherwise fastened permanently to the lever 3 to provide tamper-resistance. The stroke indicator label 7 is shown partitioned into three sectors: a first sector 7a is representative of a zero stroke position of the automatic slack adjuster 1. A second sector 7b is representative of a working stroke range of the automatic slack adjuster 1, and a third sector 7c is representative of an overstroke region of the automatic slack adjuster. The automatic slack adjuster 1 further includes a stroke indicator element 9 that is configured to indicate and visualize which state according to sector 7a, b, c the automatic slack adjuster 1 is currently in. To facilitate a read-out, the stroke indicator element 9 includes a pointer needle 11 facing towards the stroke indicator label 7 and, according to an aspect, at least partially overlapping the stroke indicator label 7. Substantially opposite of the pointer needle 11, the stroke indicator element 9 includes a control arm 13 facing towards a mounting interface of the vehicle (not shown in FIG. 1).

The pointer needle 11 of the stroke indicator element 9 includes a tip portion 15 which, according to one aspect, is offset towards the stroke indicator label 7 relative to a base portion of the pointer needle 11, and preferably is oriented parallel to the stroke indicator label 7, to improve read-out precision further.

The lever 3 of the automatic slack adjuster 1 is configured to pivot rotationally about a rotational axis R. The stroke indicator element 9 is mounted coaxially to the rotational axis R. Preferably, the stroke indicator element 9 is radially positioned relative to the lever 3 by inserting a positioning collar 10 of the stroke indicator element 9 into a corresponding recess 8 of the lever 3. The recess 8 preferably is coaxial to a cam shaft (FIG. 2), the direction of which is indicated by "c" in FIG. 1. Preferably, the positioning collar 10 includes a plurality of protrusions 12 extending radially relative to the rotational axis R that engage correspondingly dimensioned and arranged protrusions 14 provided on the lever 3. However, it is also within the scope of the invention, and a preferred embodiment, to have the stroke indicator element 9 and the pointer needle 11 mechanically isolated from the lever 3 of the automatic slack adjuster 1 altogether to avoid a risk of inadvertently dragging the pointer needle 11 together with the pivoting movement of the lever.

Turning now to mounting interface 18 of the stroke indicator element 9, a peripheral portion of the control arm 13 includes a first elongate hole 17 that is oriented such that a mounting bracket 19 of the mounting interface 18 can be radially adjusted relative to the rotational axis R for correctly installing the stroke indicator element 9. A support rod 21, which is correspondingly dimensioned to the first elongate hole 17, engages the elongate hole 17 and at the same time is mounted to the mounting bracket 19 by fastening members 27, 29. In the present embodiment, the fastening members 27 and 29 are illustrated as a stop shoulder 27 and a fastening screw 29. Further fastening elements 25, preferably also screws, are used to releasably fix the mounting bracket 19 to the vehicle.

Further preferably, the mounting bracket 19 comprises a second elongate hole 23 that is preferably oriented substantially orthogonal or tangential to the first elongate hole 17 such as to allow for lateral or circumferential displacement of the mounting bracket 19 relative to the lever 3, again in order to improve flexibility for mounting the stroke indicator element 9 on the vehicle.

In operation, the automatic slack adjuster 1 is mounted to a wheelset 200 of a vehicle, which is illustrated in FIG. 2. The wheelset 200 includes a braking system 100 which has a brake actuator 101 that is configured to actuate a push rod 103 of the brake actuator 101. The push rod 103 is operatively coupled to the mounting interface 5 of the lever 3 of the automatic slack adjuster 1. The automatic slack adjuster 1 is mounted, preferably via the mounting bracket 19, to a support element 207, which in the present embodiment is connected to an axle 203 of the wheelset 200. Similarly, the brake actuator 101 is mounted to a corresponding support element 205 which in turn is connected to the axle 203.

The automatic slack adjuster 1 furthermore is coupled to a cam shaft 105 which transmits the pivoting movement of the slack adjuster 1 to a brake mechanism 107, for example a drum brake. The brake mechanism 107 is configured to brake a wheel 201 of the wheelset 200.

The wheelset 200 shown in FIG. 2 additionally comprises a second wheel 201' which is braked by a second braking system 100'. The second braking system 100' is identical in setup as compared to the first braking system 100, and identical elements are designated with identical reference signs plus an apostrophe.

Thus, the braking system 100' comprises a brake actuator 101' which is mounted to a support element 205' of the wheelset 200. The brake actuator 101' actuates and includes a push rod 103' that is operatively coupled to a further automatic slack adjuster 1' that is held, preferably by a mounting bracket, to a support element 207' connected to the axle 203.

The automatic slack adjuster 1' is operatively coupled to a further brake 107', which may be a drum brake, by a cam shaft 105'.

The embodiments illustrated and described herein above exemplify that the design and installation routine for an automatic slack adjuster having an indicator function is greatly simplified without sacrificing in any way the functionality as regards the read-out of the indicated stroke level.

It should of course be understood that various modifications and changes in form or detail could readily be made without departing from the scope of the invention as set forth in the following claims.

The invention claimed is:

1. An automatic slack adjuster (1) for braking systems (100) of automotive vehicles, in particular for drum brakes of commercial vehicles, the slack adjuster (1) comprising:
   a lever (3) configured to be operatively coupled to a push rod (103) of a brake actuator (101), and further configured to pivot about a rotational axis (R) when actuated by the push rod (103), the rotational axis (R) having a predetermined fixed location relative to the vehicle,
   a stroke indicator label (7) arranged on the lever and configured to designate, for the automatic slack adjuster (1), a predetermined zero stroke position, a working stroke range, and an overstroke range, and
   a stroke indicator element (9) that is configured to visually indicate the current stroke level of the automatic slack adjuster (1) between the predetermined zero stroke position (7a), the working stroke range (7b), and the overstroke range (7c) on the indicator label (7) via relative movement between the stroke indicator element (9) and the stroke indicator label (7), wherein the stroke indicator element (9) is positioned on the automatic slack adjuster (1) such that the lever (3) pivots relative to the stroke indicator element (9) about the rotational axis (R), and wherein the stroke indicator element (9) includes a mounting interface (18) configured to attach the stroke indicator element (9) to a fixed location relative to the vehicle;

wherein the mounting interface (18) includes a mounting bracket (19) configured to fasten the stroke indicator element (9) to an axle or swingarm of the vehicle;

wherein one of the mounting bracket (19) or the stroke indicator element (9) includes a first elongate hole (17) extending in a radial direction relative to the rotational axis (R) for adjusting the radial position of the mounting bracket (19) relative to the rotational axis (R), and the other of the mounting bracket (19) or the stroke indicator element (9) includes a protruding feature (21) that is dimensioned correspondingly to the elongate hole (17) and extends into the first elongate hole (17).

2. The automatic slack adjuster (1) of claim 1, wherein the stroke indicator label (7) includes a label plate that is non-releasably fixed to the lever (3).

3. The automatic slack adjuster (1) of claim 1, wherein the stroke indicator element (9) includes a pointer needle (11) extending in a radial direction towards the stroke indicator label (7).

4. The automatic slack adjuster (1) of claim 1 wherein the stroke indicator element (9) includes a control arm (13) extending in a radial direction towards the mounting interface (18).

5. The automatic slack adjuster (1) of claim 1 wherein the stroke indicator element (9) includes a positioning collar (10) that extends in an axial direction corresponding to the rotational axis (R) and is arranged concentrically around the rotational axis (R).

6. The automatic slack adjuster of claim 5, wherein the positioning collar (10) engages a correspondingly shaped recess (8) of the lever (3).

7. The automatic slack adjuster of claim 1, wherein the rotational axis (R) is coaxial to a brake shaft of a braking system.

8. The automatic slack adjuster of claim 5, wherein the positioning collar (10) includes a plurality of positioning teeth (12) that are distributed circumferentially around the collar (10).

9. The automatic slack adjuster of claim 1, wherein the stroke indicator element (9) includes the first elongate hole (17) and the mounting bracket (19) includes a second elongate hole (23) extending orthogonally or tangential to the first elongate hole (17) for adjusting the rotational position of the stroke indicator element (9).

10. The automatic slack adjuster of claim 3, wherein the pointer needle (11) includes a tip portion (15) that is offset relative to a base portion of the pointer needle (11), wherein the tip portion (15) is offset in a direction toward the indicator label (7).

11. The automatic slack adjuster of claim 1, wherein the stroke indicator element (9) and the pointer needle (11) are mechanically isolated from the lever (3) to prevent moving of the pointer needle (11) together with pivoting movement of the lever (3).

12. The automatic slack adjuster of claim 1, wherein the lever (3) defines a housing for a slack adjuster mechanism (4) disposed therein.

13. The automatic slack adjuster of claim 1, wherein the protruding feature (21) is circumferentially adjustable and releasably fixable relative to the mounting bracket (19).

14. The automatic slack adjuster of claim 1, wherein the protruding feature (21) is radially shiftable within the first elongate hole (17).

15. The automatic slack adjuster of claim 1, wherein pivoting movement of the lever (3) relative to the stroke indicator element (9) alters a visible indication of the stroke indicator element (9) at the stroke indicator label (7).

16. A braking system (100) for an automotive vehicle, in particular for a commercial vehicle, the braking system comprising:

a brake actuator (101) having a push rod (103), wherein the brake actuator actuates the push rod (103), a brake mechanism (107) that applies a braking force to a wheel (201) of the vehicle, and an automatic slack adjuster (1) operatively coupled between the brake actuator (101) and the brake mechanism (107), the automatic slack adjuster comprising:

a lever (3) operatively coupled to the push rod (103) of the brake actuator (101), wherein the lever pivots about a rotational axis (R) when actuated by the push rod (103), the rotational axis (R) having a predetermined fixed location relative to the brake mechanism, a stroke indicator label (7) arranged on the lever that designates, for the automatic slack adjuster (1), a predetermined zero stroke position, a working stroke range, and an overstroke range, and a stroke indicator element (9) that visually indicates the current stroke level of the automatic slack adjuster (1) between the predetermined zero stroke position (7a), the working stroke range (7b), and the overstroke range (7c) on the indicator label (7) via relative movement between the stroke indicator element (9) and the stroke indicator label (7), wherein the stroke indicator element (9) is positioned on the automatic slack adjuster (1) such that the lever (3) pivots relative to the stroke indicator element (9) about the rotational axis (R), and wherein the stroke indicator element (9) includes a mounting interface (18) attached to a fixed location relative to the brake mechanism;

wherein the stroke indicator remains in a fixed position relative to the brake mechanism when the lever pivots about the rotational axis;

wherein the mounting interface (18) is adjustable and includes cooperating structure in the form of an elongate hole and a protruding feature that permits radial adjustment of the stroke indicator element (9) relative to the fixed location.

17. The braking system (100) of claim 16, wherein the push rod (103) is coupled to an end of the brake lever (3) and a cam shaft (105) of the brake mechanism (107) is coaxial with rotational axis (R) and coupled to the automatic slack adjuster (1).

18. A wheelset (200) of an automotive vehicle, in particular of a commercial vehicle, the wheelset comprising:

an axle or swingarm (203), a wheel (201) rotatably mounted to the axle or swingarm, a brake actuator (101) fixedly mounted to the axle or swingarm, a brake mechanism (107) fixedly mounted to the axle or swingarm and operatively coupled to the brake actuator (101) that applies a braking force to the wheel, and an automatic slack adjuster (1) operatively coupled between the brake actuator (101) and the brake mechanism (107), the automatic slack adjuster comprising:

a lever (3) operatively coupled to the push rod (103) of the brake actuator (101), wherein the lever pivots about a rotational axis (R) when actuated by the push rod (103), the rotational axis (R) having a predetermined fixed location relative to the axle or swingarm, a stroke indicator label (7) arranged on the lever that designates, for the automatic slack adjuster (1), a predetermined zero stroke position, a working stroke range, and an overstroke range, and a stroke indicator element (9) that visually indicates the current stroke level of the automatic slack adjuster (1) between the predetermined zero stroke position (7*a*), the working stroke range (7*b*), and the overstroke range (7*c*) on the indicator label (7) via relative movement between the stroke indicator element (9) and the stroke indicator label (7), wherein the stroke indicator element (9) is positioned on the automatic slack adjuster (1) such that the lever (3) pivots relative to the stroke indicator element (9) about the rotational axis (R), and wherein the stroke indicator element (9) includes a mounting interface (18) attached to a fixed location relative to the axle or swingarm;

wherein the stroke indicator remains in a fixed position relative to the axle or swingarm when the lever pivots about the rotational axis;

wherein the mounting interface (18) is adjustable and includes cooperating structure in the form of an elongate hole and a protruding feature that permits radial adjustment of the stroke indicator element (9) relative to the fixed location.

\* \* \* \* \*